United States Patent

[11] 3,588,236

[72] Inventor Joseph G. Moller
 136 Coolidge Road, Worcester, Mass. 01602
[21] Appl. No. 878,429
[22] Filed Nov. 20, 1969
[45] Patented June 28, 1971

[54] CLAMP FOR EYEGLASS FRAMES
 1 Claim, 4 Drawing Figs.
[52] U.S. Cl. .................................................... 351/158,
 24/255A, 81/3.5, 351/41, 351/155
[51] Int. Cl. ...................................................... G02c 11/00,
 A44b 21/00
[50] Field of Search.......................................... 351/41,
 155, 158, 112; 81/3.5; 24/255 (A)

[56] References Cited
UNITED STATES PATENTS
126,901  5/1872  Phelps........................... 24/255
3,507,171  4/1970  Peters........................... 351/41UX Primary Examiner—David Schonberg
Assistant Examiner—John W. Leonard
Attorney—Charles R. Fay ABSTRACT: A spring clamp for temporary attachment to the frame of eyeglasses. The jaws of the clamp have inwardly facing pads which tend to bend the frame so that the attached temples move toward each other.

PATENTED JUN28 1971 3,588,236
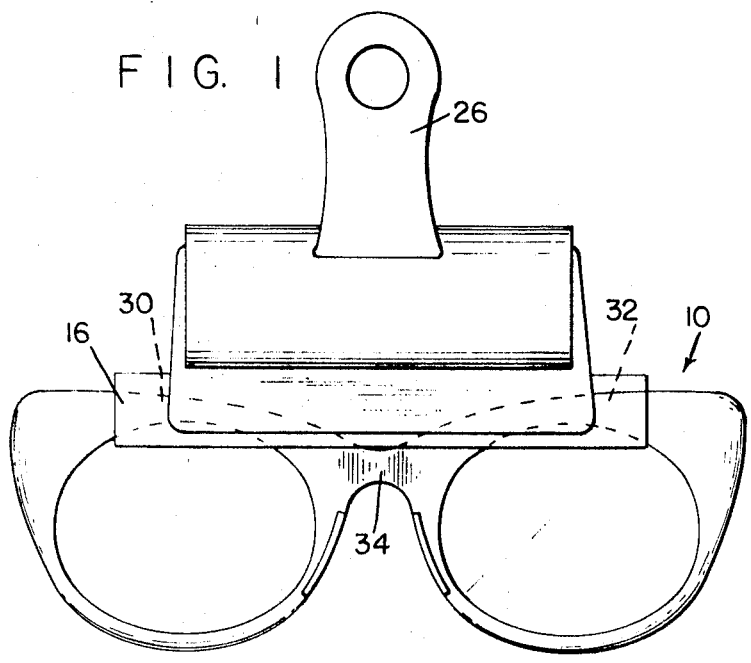
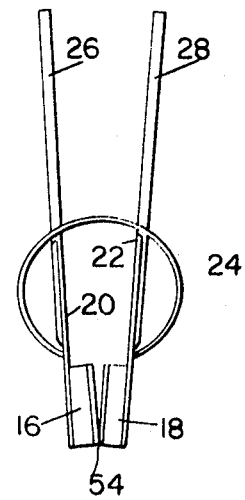
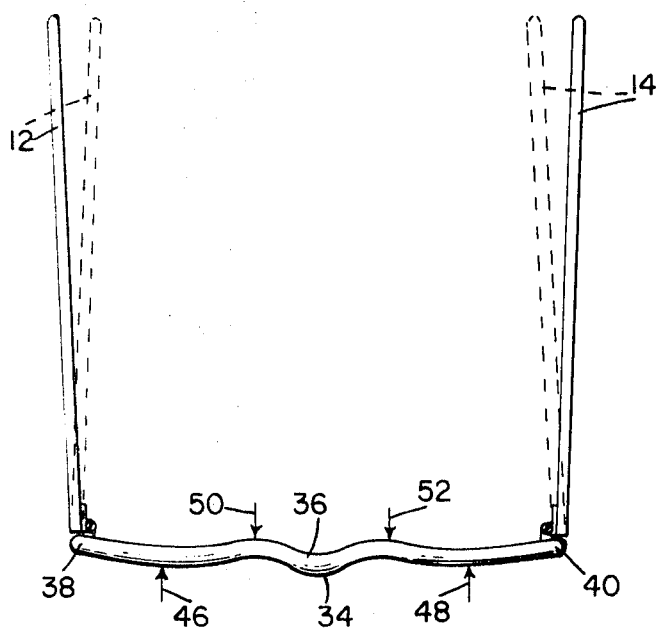
INVENTOR
JOSEPH G. MOLLER
BY Charles R. Fay,
ATTORNEY

CLAMP FOR EYEGLASS FRAMES

BACKGROUND OF THE INVENTION

Modern day eyeglass frames are notorious for gradually deflecting in such a way that the temples tend to move outwardly from the head resulting in a looseness of fit which has to be compensated for by bending the temples in toward the head to make them tight enough to hold the eyeglasses in the desired position on the face. This necessitates unwanted trips to the optometrist and in some cases this refitting of the eyeglasses must be done frequently.

SUMMARY OF THE INVENTION

This invention provides a spring clamp for slipping over the top portion of the frame of the eyeglasses at night or whenever the glasses are not being used, tending to bend the frame in a direction to cause the temples to be moved in toward each other, i.e., so as to compensate for the gradual outward bending of the temples and consequent looseness of fit on the head.

BRIEF DESCRIPTION OF THE DRAWINGS

FIG. 1 is a view in front elevation illustrating the clamp in position on the frame of eyeglasses;

FIG. 2 is an end view of the clamp;

FIG. 3 is a bottom plan view of the jaws of the clamp with the spring omitted, and FIG. 4 is a diagrammatic view illustrating the action of the clamp when in use.

PREFERRED EMBODIMENT OF THE INVENTION

The reference numeral 10 indicates the bow of any ordinary eyeglasses having the usual temples 12 and 14 mounted thereon at the ends thereof by means of the usual hinges or the like. Very often in fitting the glasses to the head of the wearer the frame 10 has its central portion placed slightly inwardly from the temples as seen in FIG. 4 in order to fit the eyeglasses to the head and it is of course well known that the temples 12 and 14 gradually move outwardly away from each other under conditions of use so that they become loose with respect to the head. When the temples loosen, the frame tends to slip at the nose.

The present invention contemplates the use of a clamp which has two elongated jaws: a front elongated jaw 16 and a rear complementary elongated jaw 18. A convenient material for these jaws is a roughened cardboard, masonite, etc.

These jaws are mounted by any desired means such as adhesives to the blades 20 and 22 of a spring clip of well-known design indicated at 24. The blades 20 and 22 are each provided with handles such as at 26, 28 and when these handles are moved together against the resilient or spring action of the spring clip, the jaws are forced apart whereupon they can be slipped over the top portions as at 30, 32 of the frame of the eyeglasses. In most cases it is desirable not to have the jaws 16 and 18 interfere with respect to the usual nosepiece 34, the latter forming a stop for positioning the clamp as is illustrated in FIG. 1.

The effect of this on a frame 10 is shown in FIG. 4 wherein the central portion of the frame as shown at 36 is slightly to the right of a line connecting the outer temple hinge portions 38, 40. This forces the frame to tend to straighten out and when this occurs, the temples 12 and 14 have a tendency to be forced toward each other into the dotted line positions as shown in FIG. 4.

If the clamp of the present invention is used at all times when the glasses are not being worn, particularly at night, the grip of the temples on the head is maintained for long periods of time without the necessity of going back to the oculist to have them bent and refitted.

It is preferred that the front jaw 16 be provided with end located pads 42, 44 and the rear jaw with a central elongated pad 46. This enhances the grip of the clamp on the frame of the eyeglasses and provides for a slightly increased pressure in the direction of the arrows shown in FIG. 4 wherein the arrows at 46, 48 represent the action of pads 42 and 44 and the arrows 50 and 52 represent the action resulting from the elongated pad 46.

Also it is to be noted from an inspection of FIG. 2 that as in the case of the ordinary spring clip at 24, the blades converge to some extent in a downward direction so that if the jaws 16 and 18 are made of rectangular blocks of material they converge centrally at their lower edges as at 54, and this causes the grip on the eye glasses to be enhanced.

I claim:

1. The combination with eyeglasses having a frame and temples, of a clamp adapted to be mounted on the frame, said clamp including a pair of generally parallel elongated jaws, end pads on one jaw and a central pad on the opposite jaw, said pads being free of each other when the jaws are closed, and spring means biasing said jaws together so that when said clamp is placed on the frame it tends to bend the frame in a direction to cause the temples attached thereto to move slightly toward each other.